May 25, 1943.　　　A. T. SMITH　　　2,320,249
IRONING PAD
Filed July 26, 1941
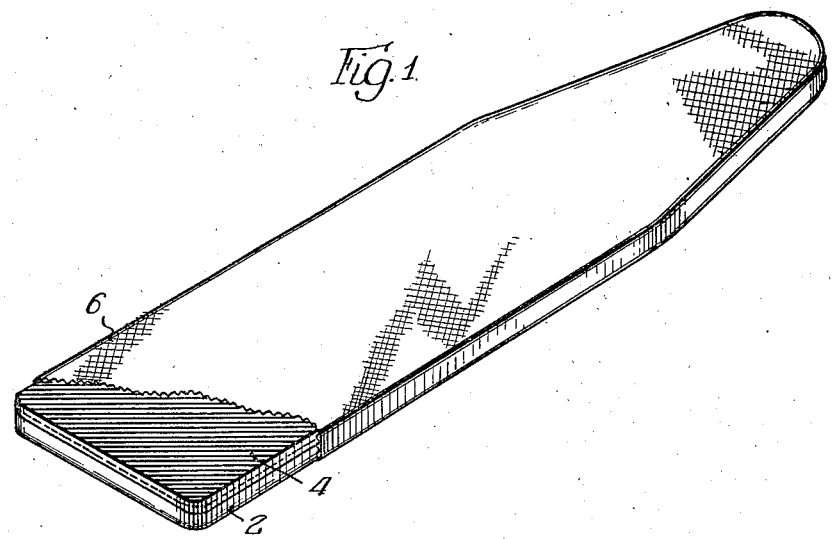
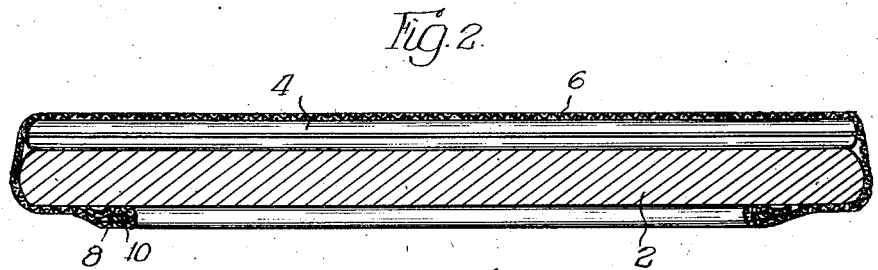
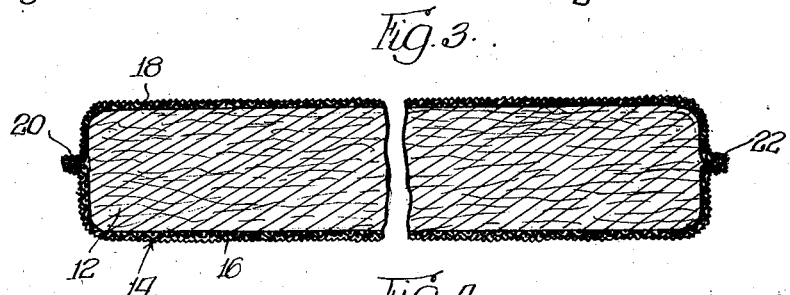
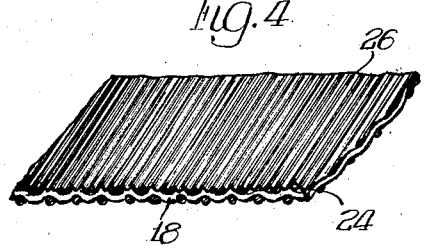
INVENTOR.
Alva T. Smith,
BY Wilkinson, Huxley, Byron & Knight
attys.

Patented May 25, 1943

2,320,249

UNITED STATES PATENT OFFICE 2,320,249

IRONING PAD

Alva T. Smith, Milwaukee, Wis., assignor to The Sunlite Mfg. Company, Milwaukee, Wis., a corporation of Wisconsin Application July 26, 1941, Serial No. 404,102

2 Claims. (Cl. 38—140)

The present invention relates to improvements in ironing devices, and more in particular to ironing pads therefor.

Among the objects of the present invention is to provide a novel ironing pad embodying a flexible covering of laminated construction, to at least one surface of which is applied in adhesive relation thereto a coating of heat-reflecting material which has its exposed surface embossed or slashed to increase its heat-reflecting properties and thereby facilitate ironing operations.

The present invention constitutes an improvement over the structure shown in Patent No. 2,214,824, issued to A. T. Smith et al. on September 17, 1940. In devices of the kind herein contemplated, surface coatings of resinous or thermoplastic material have been found highly satisfactory because of their property of reflecting heat from the surface thereof, which facilitates ironing operations. In certain instances such thermoplastics may have incorporated therein additional material increasing the heat-reflecting properties of the same. Thermoplastic material is highly desirable in the environment in which used as herein indicated because of its flexibility and because, under the application of ironing temperatures, the same becomes soft, providing additional flexibility in the ironing pad cover, thus greatly facilitating the ironing process. These pads, however, are used in conjunction with a cover interposed between the goods being ironed and the said resinous or thermoplastic covering for the said pad, and when such resinous or thermoplastic materials become soft the said cover has a tendency to adhere to such resinous or thermoplastic materials and become laminated therewith. This is highly objectionable in that it often becomes necessary to remove the protective covering and to replace the same, and such adherence of the same to these resinous or thermoplastic materials makes it oftentimes necessary to replace the entire pad in that any attempt to remove the cover from the said resinous or thermoplastic material causes injury to the surface of the said pad.

It is therefore an object of the present invention to so process the exposed surface of the resinous or thermoplastic material as to eliminate this tendency of the cover to adhere to the resinous or thermoplastic material, and the said processing further increases the effective heat and light-reflecting properties of the said resinous or thermoplastic materials.

As a still further object of the present invention, an ironing pad is contemplated which has all of the inherent characteristics of the pad set forth in the above mentioned Smith et al. patent and in which the surface of the resinous or thermoplastic material is embossed or slashed to increase the effective area, thereby increasing its heat and light-reflecting properties.

Other objects, features, capabilities and advantages are comprehended by the invention, as will later appear and as are inherently possessed thereby.

Referring to the drawing:

Figure 1 is a view in perspective with certain parts cut away to disclose an ironing device incorporating a pad made in accordance with the present invention;

Figure 2 is a transverse cross-sectional view of the device shown in Figure 1 of the drawing;

Figure 3 is an enlarged fragmentary view of the ironing pad shown in Figures 1 and 2 of the drawing; and Figure 4 is an enlarged fragmentary view in perspective of the covering for the pad as shown in the previously mentioned figures.

Referring now more in detail to the drawing, an ironing device selected to illustrate the invention is shown as comprising an ironing board 2 of conventional form adapted to support an ironing pad 4 made in accordance with the present invention and which pad is secured to the ironing board by means of a cover 6. The cover 6 has its marginal edges overlapping the pad and board and which are formed with a stitched fold 8 enclosing a resilient element such as 10 to hold the cover in operative position with respect to the board.

The ironing pad 4, as well as the cover 6, are of a size and shape to conform to the ironing board 2.

The present invention has to do more in particular with the construction of the pad 4 as shown in Figure 3, which includes a filler 12 of any suitable material, the one disclosed being of fibrous material such as felt, cotton or wool, but preferably of jute or some other equivalent substance which is resilient and flexible in its characteristics to facilitate an ironing operation. The said filler or pad is completely enclosed within a cover 14 formed from one or more pieces of textile fabric, such as 16 and 18, sewn as at 20 and 22 along their marginal edges to form the completed structure.

In the illustrative embodiment of the invention, the textile fabric 18 has applied to the surface thereof in adhesive relation thereto a coating of heat and light-reflecting material 24 which, in the present illustration, may comprise various resinous or thermoplastic materials, one of the better known being polyvinyl chloride, which makes a very satisfactory laminated structure in conjunction with the said textile fabric 18. Pigment or any other desired ingredient may be incorporated in the resinous or thermoplastic material as desired.

While structures of the type above are quite satisfactory from the standpoint of facilitating ironing operations, all in accordance with the disclosure in the above-named Smith et al. patent, nevertheless some difficulty has been experienced in that the said resinous or thermoplastic material, under the influence of ironing temperatures, becomes soft and adheres or laminates to the covering 6, which is particularly disadvantageous when removal and replacement of the said cover 6 become necessary. Any attempt to break the adhesion between the said cover and the surface of the pad causes damage to the pad, which makes its replacement necessary if the full advantages of this type of pad are to be obtained.

In order to overcome the tendency of the cover to laminate or adhere to the surface of the resinous or thermoplastic coating on the pad 4 and to likewise increase the heat and light-reflecting properties of this coating, the said coating 24 in the improved structure according to this disclosure has its exposed surface embossed, slashed or otherwise processed to form a roughened surface involving minute crests and impressions as illustrated at 26 in exaggerated form in Figure 4 of the drawing. This slashing or embossing may be effected by passing the coated textile material through rollers which have the surfaces thereof suitably formed to make the impressions illustrated in the drawing. While the illustration of Figure 4 shows the slashings diagonally disposed in respect to the fabric, nevertheless such roller surfaces may be constructed to impress any desired design into the surface coating of resinous or thermoplastic material. The undulating surface formation for said material not only lessens any tendency for the cover to stick to the coating, but also greatly increases the effective exposed area of the pad, which increases the heat and light-reflecting properties thereof. It is understood, of course, that during an ironing operation the cover absorbs heat from the iron as the same passes over the object being pressed, which heat is reflected into and through the said object after the iron is removed from any one area of the object or is moved to another portion thereof. Thus during the normal movements of the operator during such ironing operation greater ironing efficiency is obtained due to the radiant heat emitted from the surface of the pad.

In practising the present inventions, coating materials having high temperature resisting qualities are contemplated. Of course, during an ironing operation, the temperature of the iron is elevated well above the critical softening point of the material, but in the presence of moisture and steam in the clothes the material remains comparatively firm. Under such conditions of operation, the embossing does not disappear and is retained to produce the results herein set forth.

While I have herein described and upon the drawing shown an illustrative embodiment of the invention, it is to be understood that the invention is not limited thereto but may comprehend other constructions, arrangements of parts, details and features without departing from the spirit of the invention.

I claim:

1. In an ironing device, the combination of a pad of resilient material, a cover for said pad, an enclosure for said pad characterized by having heat-reflecting properties and comprising a laminated flexible structure including a layer of fabric to the outer surface of which adjacent said cover is applied in adhesive relation thereto a coating of resinous material, said material having its surface embossed to increase its heat-reflecting properties and tending to prevent adhesion between the same and said cover.

2. In an ironing device, the combination of a pad of resilient material, a cover for said pad, an enclosure for said pad characterized by having heat-reflecting properties and comprising a laminated flexible structure including a layer of fabric to the outer surface of which adjacent said cover is applied in adhesive relation thereto a coating of thermoplastic material, said material having its surface embossed to increase its heat-reflecting properties and tending to prevent adhesion between the same and said cover.

ALVA T. SMITH.